United States Patent Office 2,912,434
Patented Nov. 10, 1959

2,912,434

PREPARATION OF INDENOTHIAZOLES AND CYANINE DYES THEREFROM

George de Stevens, Portland, and Robert H. Sprague, East Hampton, Conn., assignors to Sperry Rand Corporation, New York, N.Y., a corporation of Delaware No Drawing. Application August 22, 1955
Serial No. 529,965

18 Claims. (Cl. 260—240.1)

This invention relates to new indenothiazole bases and to quaternary salts and cyanine dyes therefrom.

Cyanine dyes contain at least two auxochromic nitrogen atoms, the one ternary and the other quaternary, the one nitrogen atom lying in one heterocyclic nucleus and the other lying in another heterocyclic nucleus, the two nitrogen atoms being connected by a conjugated carbon chain.

We have now found that it is possible to prepare cyanine dyes in which one or both of the above mentioned auxochromic nitrogen atoms lie in a (2, 1d) indenothiazole nucleus. We have further found that these new cyanine dyes sensitize photographic emulsions strongly and cleanly, i.e. without producing excessive fog or residual dye stain.

It is accordingly an object of our invention to provide new cyanine dyes. A further object is to provide photographic emulsions sensitized with such dyes. Other objects will appear hereinafter.

As starting material for the preparation of our new dyes we employ (2, 1d) indenothiazole and 2-methyl-(2, 1d) indenothiazole. We first convert the idenothiazole base to quaternary salts by reacting the base with esters, such as alkyl halides, alkyl sulfates, or alkyl-p-toluene sulfonates, for example. For purposes of convenience the quaternary salts useful in practicing this invention can be represented by the following single formula:

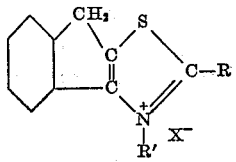

wherein R' represents an alkyl group, e.g. methyl, ethyl, n-propyl, isobutyl, n-butyl, β-hydroxyethyl, β-methoxyethyl, β-ethoxyethyl, β-acetoxyethyl, β-carboxyethyl, carboxymethyl, β-carbomethoxyethyl, β-carbethoxyethyl, allyl, etc. or an aralkyl group, e.g. benzyl, phenyl-ethyl, etc. R represents methyl, or hydrogen and X⁻ represents an anion, e.g. chloride, bromide, iodide, benzene sulfonate, p-toluene sulfonate, methyl sulfate, ethyl sulfate, thiocyanate perchlorate, acetate, etc.

To prepare pseudocyanine dyes from such quaternary salts we react the quaternary salts with 2-halogenoquinoline quaternary salts, in the presence of an acid binding agent, such for example, as sodium ethylate, sodium carbonate, pyridine or a strong organic base (e.g. triethyl amine, tri-methylamine and N-methyl piperidine). We have found it advantageous to employ a mixture of pyridine with a strong tertiary organic base.

Instead of 2-halogenoquinoline quaternary salts we can employ 2-alkyl mercapto or 2-aryl mercaptoquinoline quaternary salts to condense with the quaternary salts of (2, 1d) indenothiazole or 2-methyl (2, 1d) indenothiazole in the presence of an acid binding agent.

Using 2-halogenopyridine quaternary salts instead of 2-halogenoquinoline quaternary salts we can prepare pyrido-cyanine dyes containing a (2, 1d) indenothiazole nucleus.

Using 2-alkyl mercapto or 2-aryl mercaptobenzothiazole or naphthothiazole salts we can prepare simple cyanine dyes other than pseudocyanine dyes.

To prepare unsymmetrical carbocyanine dyes from (2, 1d) indenothiazole or 2-methyl (2, 1d) indenothiazole quaternary salts we react the quaternary salts with cyclo-ammonium quaternary salts containing a β-aryl amino-vinyl group in the alpha or gamma position, i.e. in one of the so-called reactive positions in the presence of an acid binding agent, e.g. pyridine or pyridine plus triethyl amine.

To prepare styryl dyes from our new quaternary salts we condense them with p-dialkyl aminobenzaldehyde in the presence of an alkaline catalyst, e.g. piperidine in absolute ethanol solution.

To prepare merocarbocyanine dyes from (2, 1d) indenothiazole or 2-methyl (2, 1d) indenothiazole quaternary salts we condense the quaternary salts with ketomethylene heterocyclic intermediates containing an aryl aminomethylene group in the 5-position in the presence of an acid binding agent, e.g. pyridine plus triethyl amine. Examples of such ketomethylene intermediates are 5-acetanilidomethylene-3-lethyl rhodanine, 5-acetanilidomethylene-3-ethyl-1-phenyl-2-thiohydantoin, etc.

To sensitize photographic silver halide emulsions with our new dyes, we disperse the dyes in the emulsions. Our invention is particularly directed to the customarily employed gelatino-silver-halide emulsions, such as the gelatino-silver-bromide, bromiodide, chloride and chlorobromide for example. The methods of incorporating dyes in emulsions are simple and well known to those skilled in the art and described in various patents and publications, for example, U.S. Patent 2,336,843, patented Dec. 14, 1943.

We have prepared two new heterocyclic bases, 2-methyl- (2, 1d) indenothiazole (I) and (2, 1d) indenothiazole (II) by condensing 2-bromo indanone with thioacetamide and thioformamide respectively.

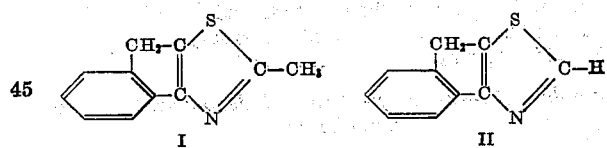

I  II

We have also found that the quaternary salts of these heterocyclic bases condense readily with the usual cyanine dye intermediates to form dyes useful as photographic sensitizers. In some cases, further condensation occurs through the methylene group giving new trinuclear complex dyes.

The following examples will serve to illustrate our invention and the method of preparation of the dyes. These examples are not, however, intended to limit our invention.

*Example 1.—2-methyl (2,1d) indenothiazole*

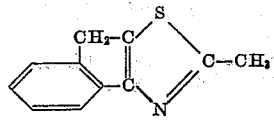

106 g. (0.5 mole) of 2-bromoindanone (Wilds, J.A.C.S., 68, 86 (1946)) was dissolved in 250 cc. of abs. C₂H₅OH. To this solution there was added 37.5 g. (0.5 mole) of thioacetamide. The mixture was heated on the steam bath for 1½ hours. The alcohol was then removed at reduced pressure. Five percent aqueous hydrobromic acid solution (200 cc.) was added to the residue. This heterogeneous mixture was extracted thoroughly with ether. After separation of the ether, the aqueous HBr mixture was made alkaline with ammonium hydroxide, extracted with ether, dried over $K_2CO_3$, and the ether was removed. The solid residue was distilled at reduced pressure collecting the fraction coming over at 147°–140°/12.8 mm., which solidified on cooling. This base was obtained in 25% yield.

*Example II.*—*(2,1d) indenothiazole*

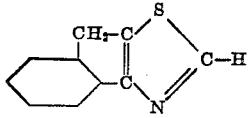

To 21 g. (0.1 mole) of 2-bromoindanone there was added 35 cc. of abs. $C_2H_5OH$ and 7 g. (0.1 mole) of thioformamide. The mixture was heated on the steam bath. Within a short time a vigorous reaction occurred with the precipitation of much white solid. The mixture was heated on the steam bath for 1 hour. The alcohol was then removed at reduced pressure. The viscous red material was dissolved in 200 cc. of 10% aqueous HB solution (much tar remained undissolved). The acid solution was extracted thoroughly with ether. The acid solution was then made alkaline with ammonium hydroxide whereupon a red oil separated out. This basic mixture was extracted with ether and the ether extract dried over $K_2CO_3$. After removal of the ether, the residue was distilled at reduced pressure. No forerun was obtained. The product was collected at 180°–184°/24 mm. in 23% yield.

*Example III.*—*2-methyl-(2,1d) indenothiazole ethiodide*

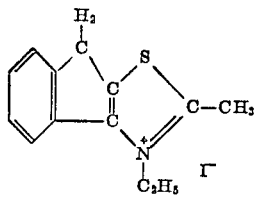

10.0 g. (0.05 moles) of 2-methyl-(2,1d) indenothiazole and 9.5 g. (0.05 moles 10% excess) of ethyl iodide were heated at reflux on a steam bath for 8 hours. After chilling, the precipitate was collected at the pump, washed well with ether then acetone and air dried. The yield of acetone-recrystallized-quaternary salt, M.P. 233°–235° d., was 70% of theoretical.

*Example IV.*—*2-methyl-(2,1d) indenothiazole etho perchlorate*

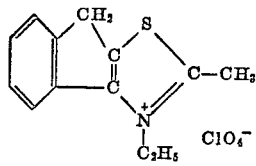

To 0.1 g. of 2-methyl-(2,1d) indenothiazole ethiodide dissolved in 5 cc. of methanol there was added 15 cc. of methanol containing 0.2 g. of sodium perchlorate. The solution was chilled at 0° overnight. The crystals were collected on a filter and washed with a small amount of cold methanol. After drying in vacuo the crystals melted at 218° C.

*Analysis.*—Calc'd for $C_{13}H_{14}ClNO_4S$: N, 4.438%; S, 10.16%. Found: N, 4.43%; S, 10.13%.

*Example V.*—*(2,1d) indenothiazole ethiodide*

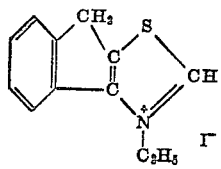

2.3 g. (0.015 moles) of (2,1d) indenothiazole and 3.0 g. (0.015 moles 20% excess) of ethyl iodide were refluxed for 6 hours. On chilling, the precipitate was washed well with ether, then acetone and dried in vacuo. The yield of crude quaternary salt, melting at 209°–211° C. was 67% of theoretical. 0.5 g. of crude salt was recrystallized from 45 cc. of acetone containing Norite to give an analytically pure sample.

*Analysis.*—Calc'd for $C_{12}H_{12}INS$: N, 9.74%. Found: N, 9.68%.

*Example VI.*—*3,3'-diethyl-8'-[(3-ethyl-2(3)-benzoxazolylidene) ethylidene] oxa-(2',1d) indenothiazole carbocyanine iodide*

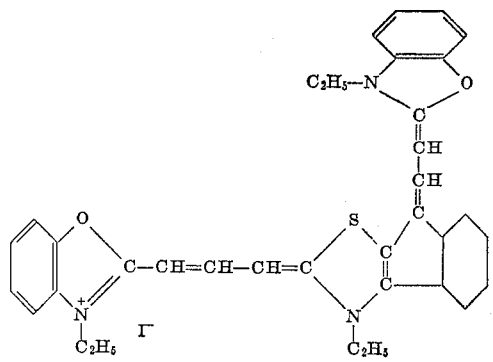

1.7 g. (1 mol.) of 2-methyl-(2,1d) indenothiazole ethiodide, 2.4 g. (1 mol.) of 2-β-acetanilidovinyl benzoxazole ethiodide were dissolved in 15 cc. of boiling absolute ethyl alcohol, to which solution was added 1.0 g. of triethylamine. Reaction commenced immediately, the color changing from pink to deep greenish brown. The mixture was refluxed for 5 minutes. On cooling, the precipitate was collected on a filter and washed with water and then acetone. The acetone extract was concentrated whereupon gold needles separated out. These were recrystallized twice from methanol (750 cc./gram), to give an 8% yield of pure dye, M.P. 288°d., in the form of bronze needles.

A methanol solution of dye was green with absorption maxima at 458 mu. and 460 mu.

*Analysis.*—Calc'd for $C_{35}H_{32}IN_3O_2S$: C, 61.30%; H, 4.709%; N, 6.132%; S, 4.679%; I, 18.32%. Found: C, 61.22%; H, 4.74%; N, 6.20%; S, 4.67%; I, 18.34%.

*Example VII.*—*3,3'-diethyl-8'-[(3-ethyl-2(3) thiazolinylidene) ethylidene] (2',1'd) indenothiazolinothiazolocarbocyanine iodide*

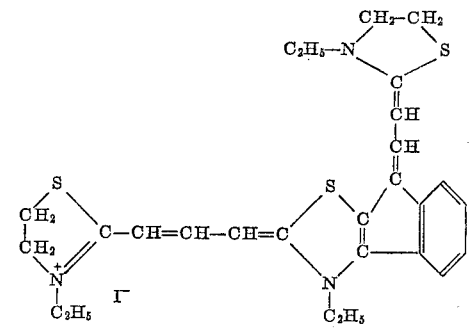

1.0 g. (1 mol.) of 2-methyl-(2,1d) indenothiazole ethiodide and 1.0 g. (1 mol.) of 2-β-acetanilidovinyl thiazoline ethiodide were dissolved in 15 cc. of boiling absolute ethyl alcohol. Triethylamine (1.0 g.) was added to this solution and refluxing was continued for 10 minutes. After chilling overnight, the precipitate was collected on a filter, washed well with water, then acetone and air dried. Two recrystallizations from methanol (200 cc. per gram) gave a 20% yield of pure dye in the form of blue plates. The dye melted at 286°–288° C. with decomposition.

A methanol solution of the dye was green with absorption maxima at 446 mu and 625 mu.

*Example VIII.—3,3'-diethyl-8'-(3 - ethyl - 2(3)-benzothiazolylidene)-(2',1'd) indenothiathiazolocyanine iodide*

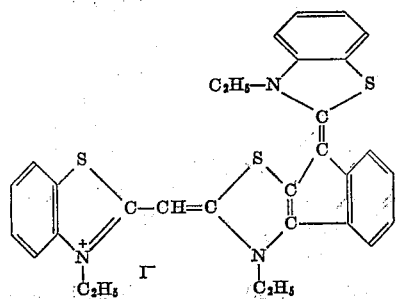

1.7 g. (1 mol.) of 2-methyl-(2,1d) indenothiazole ethiodide, 3.6 g. (2 mol.) of 2-methyl mercaptobenzothiazole etho-p-toluene sulfonate, 20 cc. of absolute ethyl alcohol and 2.0 g. of triethylamine were refluxed for 20 minutes. After chilling overnight, the product was collected on a filter, washed well with water, then acetone and dried in vacuo. The yield of dye was 35% of theoretical. Two recrystallizations from methanol (1200 cc. per gram) gave a 25% yield of pure dye in the form of orange needles. The dye melted at 280°–282° C. with decomposition.

A methanol solution of the dye was orange red in color with absorption maxima at 430 mu and 524 mu.

*Analysis.*—Calc'd for $C_{29}H_{28}N_3S_3I$: N, 6.55%; S, 15.00%. Found: N, 6.49%; S, 14.92%.

*Example IX.—3,3'-diethyl-9-methyl (2',1'd) indenothiathiazolocarbocyanine iodide*

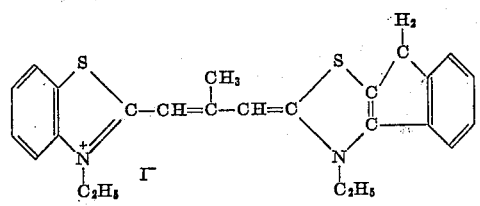

3.4 g. (1 mol.) of 2-methyl (2,1d) indenothiazole ethiodide, 4.4 g. (1 mol.) of 2(2-methyl mercaptopropenyl) benzothiazole etho-p-toluene sulfonate, 25 cc. of absolute ethyl alcohol and 2.0 g. of triethylamine were refluxed 30 minutes. After chilling overnight, the precipitate was collected on a filter, washed well with water, then acetone and air dried. Two recrystallizations from methanol (300 cc. per gram) gave a 28% yield of pure dye in the form of dark red crystals melting at 265°–266° d.

A methanol solution of dye was deep red with an absorption maximum at 540 mu.

*Analysis.*—Calc'd for $C_{25}H_{25}N_2S_2I$: S, 11.79%; I, 23.32%. Found: S, 11.77%; I, 23.54%.

*Example X.—3,3' - diethyl-8'[(3-ethyl-2(3)-benzoxazolylidene) ethylidene] 9-methyl-(2',1'd) indenothiathiazolocarbocyanine iodide*

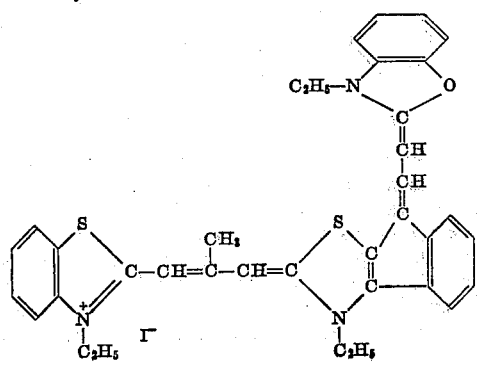

0.2 g. (1 mol.) of 2-β-acetanilidovinyl benzoxazole ethiodide, 0.2 g. (1 mol.) of 3,3'-diethyl-9-methyl-(2',1'd) indenothiazolocarbocyanine iodide (see Example IX), 20 cc. of pyridine and 0.2 g. of triethylamine were refluxed for one hour. The green colored solution was concentrated to half its volume. On cooling, ether was added to the dye solution. After chilling, the ether was decanted and the residue washed twice more with fresh portions of ether. The ether was removed and the residue was washed with methanol. A blue precipitate was formed which was collected on a filter, washed well with methanol and dried in vacuo. After two recrystallizations from methanol (500 cc. per gram) a 40% yield of pure dye was obtained. The dye softens at 208°–210° C. and melts at 236°–238° C. with decomposition.

A methanol solution of the dye was green with absorption maxima at 474 mu and 650 mu.

*Example XI.—2-methyl-8-(1-methyl-4(1)-quinolylidene)-(2,1d) indenothiazole ethiodide*

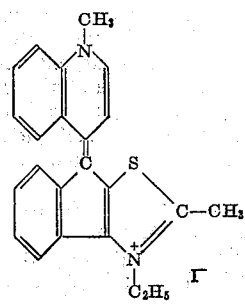

A mixture of 1.0 g. (1 mol.) of 2-methyl-(2,1d) indenothiazole ethiodide, 1.2 g. (1 mol.) of 4-phenyl mercaptoquinoline metho-p-toluene sulfonate, 15 cc. of absolute ethyl alcohol and 1.0 g. of triethyl amine was refluxed 5 minutes. After chilling the precipitate was collected at the pump, washed well with water, then acetone and air dried. The yield of crude dye was 65% of theoretical. After two recrystallizations from methanol (150 cc. per gram) a 50% yield of pure dye was obtained in the form of tiny black needles melting at 235° C. with decomposition.

A methanol solution of the dye was deep red with absorption maxima at 410 mu and 560 mu.

*Example XII.—8-(1-ethyl-4(1) quinolylidene) (2,1d) indenothiazole ethiodide*

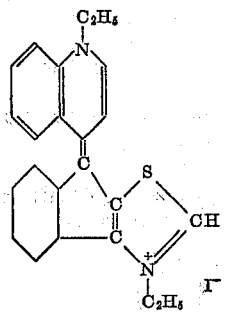

1.5 g. (1 mol.) of (2,1d) indenothiazole ethiodide, 2.3 g. (1 mol.) of 4-phenylmercaptoquinoline etho-p-toluene sulfonate, 15 cc. of absolute ethyl alcohol and 0.5 g. of triethylamine were refluxed 20 minutes. After chilling overnight, the crystals were collected at the pump, washed well with water, then acetone and air dried. After two recrystallizations from methanol (50 cc. per gram) a 10% yield of pure dye in the form of tiny black needles was obtained. The dye melted at 218°–220° C. with decomposition.

A methanol solution of the dye was deep red with absorption maxima at 420 mu. and 564 mu.

*Example XIII.—8-(3-ethyl-2(3)-benzothiazolylidene)-(2,1d) indenothiazole ethiodide*

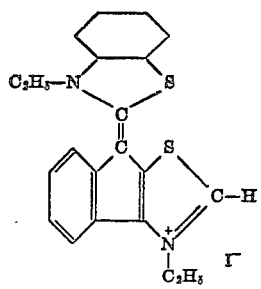

1.0 g. (1 mol.) of (2,1d) indenothiazole ethiodide, 1.10 g. (1 mol.) of 2-methyl mercaptobenzothiazole etho-p-toluene sulfonate, 20 cc. of absolute ethyl alcohol, and 0.5 g. of triethylamine were refluxed 10 minutes. A copious orange precipitate immediately formed. After chilling, the precipitate was collected on a filter, washed well with water, then acetone and air dried to give 35% yield of crude dye. Two recrystallizations from methanol (200 cc. of per gram) gave a 22% yield of pure dye in the form of felted orange needles melting at 261°–262° C. d.

A methanol solution of the dye was yellow with an absorption maximum at 442 mu.

*Analysis.*—Calc'd for $C_{21}H_{19}N_2S_2I$: N, 5.716%; S, 13.08%. Found: N, 5.46%; S, 12.92%.

*Example XIV.—3-ethyl-5-[(3-methyl-(2,1d) indeno 2,(3) thiazolylidene)ethylidene]rhodanine*

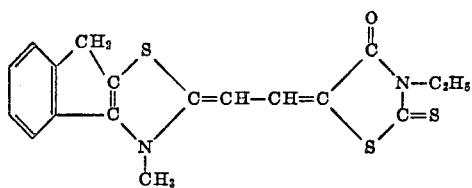

1.0 g. (1 mol.) of 2-methyl-(2,1d) indenothiazole methiodide, 0.9 g. (1 mol.) of 5-acetanilidomethylene-3-ethyl rhodanine, 15 cc. of absolute ethyl alcohol and 1.0 g. of triethylamine were refluxed 20 minutes. After chilling overnight, the crystals were collected on a filter, washed well with water, then acetone and air dried. The dye was purified by dissolving in hot pyridine and precipitating through the addition of methanol. In this way a 20% yield of pure dye was obtained melting at 248°–249° C. d.

A methanol solution of the dye was red with an absorption maximum at 556 mu.

*Example XV.—2-methyl (2,1d) indenothiazole methiodide*

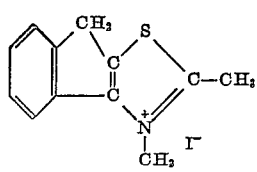

4.0 g. (1 mol.) of 2-methyl (2,1d) indenothiazole and 3 g. (1 mol. 10% excess) of methyl iodide were refluxed for 1 hour. After chilling, the precipitate was collected on a filter, washed well with ether, then acetone and dried in vacuo to give a 57% yield of product which melted at 266°–267° C. d.

*Example XVI.—3,3'-diethyl-8'-(1-methyl-4(1)-quinolylidene) thia (2,1d) indeno thiazolocyanine iodide*

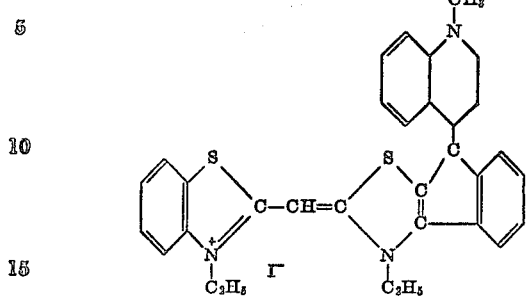

0.26 g. (mol.) 8-(1-ethyl-4(1)-quinolylidene)-2-methyl (2,1d) indenothiazole ethiodide, 0.19 g. (1 mol.) of 2-methyl mercaptobenzothiazole etho-p-toluene sulfonate, 10 cc. of absolute ethyl alcohol and 5 drops of triethylamine were refluxed for 10 minutes. After chilling for several hours, the precipitate was collected on a filter, washed with water, then cold ethyl alcohol and air dried. Two recrystallizations from methanol (200 cc. per gram) gave a 25% yield of pure dye in the form of felted black needles. The dye melted at 240°–243°.

A methanol solution of the dye had absorption maxima at 448 mu. and 625 mu.

It is well known that cyanine dyes resonate between two extreme forms and that a cyanine dye can be represented by either of the two extreme forms. Thus, the unsymmetrical type of instant dyes can be represented by either of the following formulas.

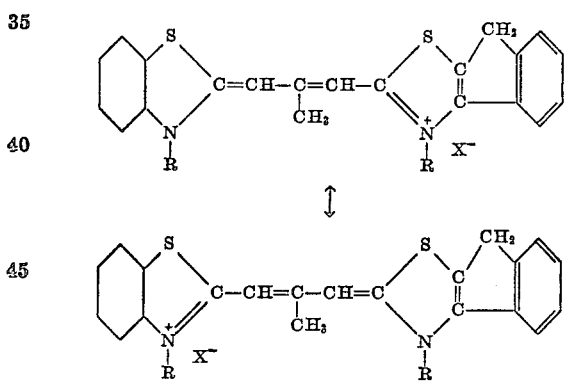

The features of novelty which we believe to be characteristic of our invention are set forth with particularity in the following claims. It should be understood, however, that modifications and changes may be made, without departing from the spirit and substance of our invention, as will be apparent to those skilled in the art.

What we claim is:

1. A dye selected from the group characterized by the following general formula:

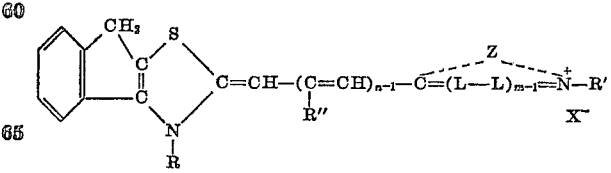

where R, R' and R" represent members selected from the group consisting of alkyl and aralkyl groups, $m$ represents a positive integer from 1 to 2, L represents a methine group, $n$ represents a positive integer from 1 to 3, both inclusive, $X^-$ represents an anion and Z represents the non-metallic atoms necessary to complete a heterocyclic nucleus containing from 5 to 6 atoms in the heterocyclic ring, said nucleus being selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series, and a nucleus of the 3,3-dialkyl indolenine series.

2. 3,3'-diethyl-9-methyl (2',1',d) indenothiathiazolo carbocyanine iodide having the following structure:

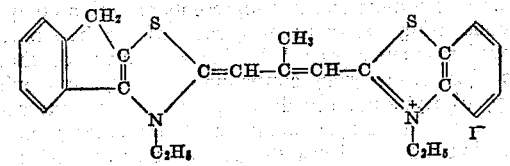

3. A dye selected from the group characterized by the following general formula:

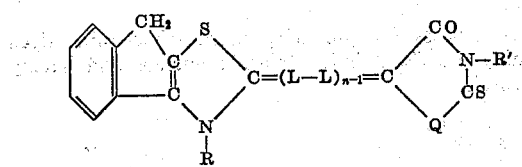

where R represents a member selected from the group consisting of alkyl and aralkyl groups, R' represents a member selected from the group consisting of alkyl, aryl and aralkyl groups, L is a methine group, n is a positive integer from 1 to 4, both inclusive, and Q is a member selected from the group consisting of oxygen, sulfur, selenium or =NR'.

4. 3-ethyl-5-[(3-methyl-(2,1d) indeno (2,3) thiazolylidene) ethylidene]rhodanine having the structure:

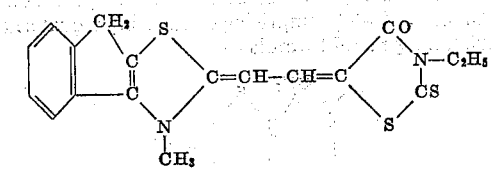

5. A dye selected from the group characterized by the following general formula:

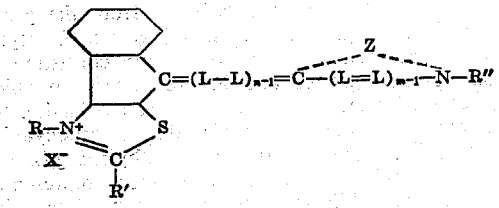

where R and R" represent members selected from the group consisting of alkyl and aralkyl groups, R' represents a member selected from the group consisting of hydrogen and a methyl group, L represents a methine group, n and m are positive integers from 1 to 2, X represents an anion and Z has the same meaning as in claim 1.

6. 2 - methyl-8-(1-methyl-4(1) quinolylidene)-(2,1d) indenothiazole ethiodide having the structure:

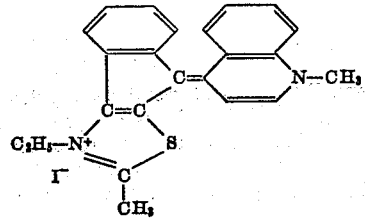

7. 8-(1-ethyl-4(1)-quinolylidene)(2,1d) indenothiazole ethiodide.

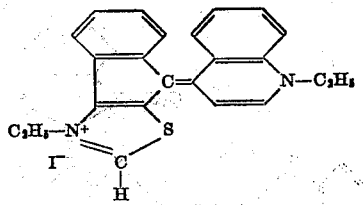

8. 8 - (3 - ethyl-2(3)-benzothiazolylidene)-(2,1d)-indenothiazole ethiodide having the structure:

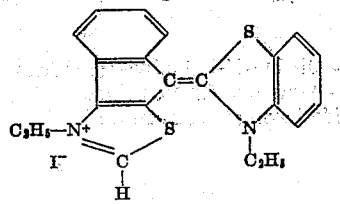

9. A dye selected from the group characterised by the following general formula:

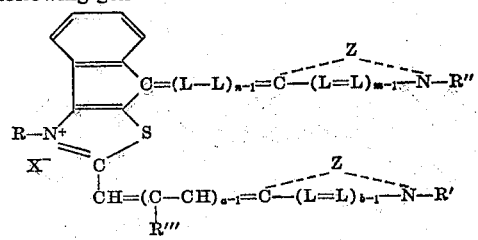

where R, R' and R" represent members selected from the group consisting of alkyl and aralkyl groups, R'" represents a member selected from the group consisting of hydrogen and an alkyl group, L represents a methine group, b, m and n represent members selected from the group of positive integers from one to two, a represents a positive integer from 1 to 3, X represents an anion and Z has the same meaning as in claim 1.

10. 3,3' - diethyl - 8'[(3-ethyl-2(3)-benzoxazolylidene) ethylidene]oxa-(2',1'-d) indenothiazolocarbocyanine iodide having the structure:

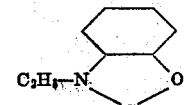

11. 3,3'-diethyl-8'[(3-ethyl-2(3) thiazolinylidene ethylidene](2',1'-d) indenothiazolinothiazolocarbocyanine iodide having the structure:

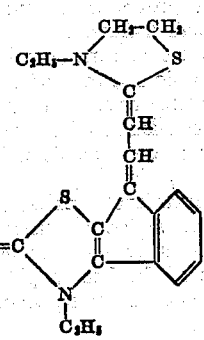

12. 3,3'-diethyl-8'-[(3-ethyl-2(3)benzothiazolylidene)] (2',1'd) indenothiathiazolocyanine iodide having the structure

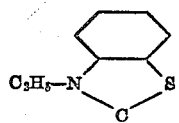

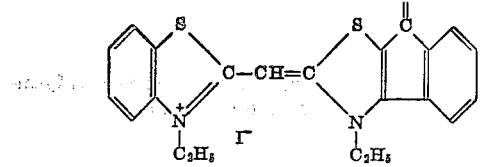

13. 3,3' - diethyl-8'-[(3-ethyl-2(3)benzoxazolylidene) ethylidene] - 9-methyl (2',1'd) indenothiathiazolocarbocyanine iodide having the structure:

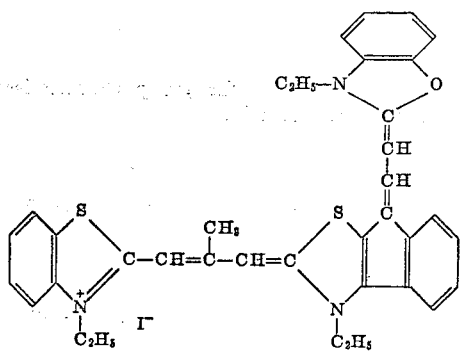

14. 3,3'-diethyl-8'-(methyl-4(1) quinolylidene) thia (2,1d) indenothiazolocyanine iodide having the structure:

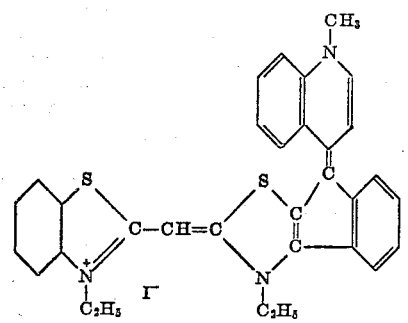

15. A process for preparing unsymmetrical cyanine dyes having the general formula

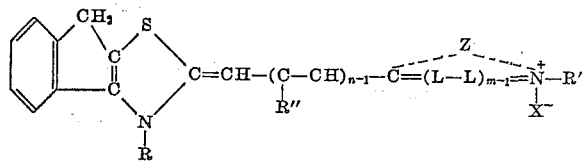

wherein R, R' and R" represent members selected from the group consisting of alkyl and aralkyl groups, m represents a positive integer from 1 to 2, L represents a methine group, n represents a positive integer from 1 to 3, both inclusive, X⁻ represents an anion and Z represents the non-metallic atoms necessary to complete a heterocyclic nucleus containing from 5 to 6 atoms in the heterocyclic ring, said nucleus being selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series, and a nucleus of the 3,3 dialkyl indolenine series from the quaternary salt having the general formula

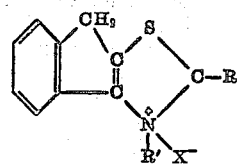

where R represents a member selected from the group consisting of hydrogen and a methyl group, R' represents a member selected from the group consisting of alkyl and aralkyl groups and X⁻ represents an anion comprising condensing the quaternary salts with a heterocyclic ammonium quaternary salt having a reactive constituent selected from the group consisting of an aryl aminovinyl group, an aryl aminobutadienyl group, an alkyl mercapto vinyl group, a halogen atom and a thioether group in a position selected from the group consisting of alpha and gamma positions with respect to the nitrogen atom in said heterocyclic ring of said heterocyclic ammonium quaternary salt in the presence of an alkaline condensing agent.

16. A process for preparing merocarbocyanine dyes containing the (2,1d)indenothiazole nucleus and having the formula

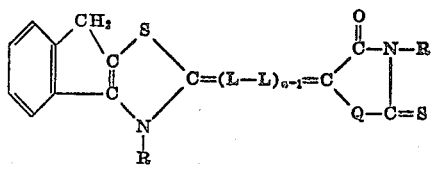

wherein R represents a member selected from the group consisting of alkyl and aralkyl groups, R' represents a member selected from the group consisting of alkyl, aryl and aralkyl groups, L is a methine group, n is a positive integer from 1 to 4, both inclusive, and Q is a member selected from the group consisting of oxygen, sulfur, selenium, or =N—R' comprising condensing a quaternary salt having the general formula

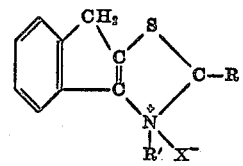

where R represents a member selected from the group consisting of hydrogen and a methyl group, R' represents a member selected from the group consisting of alkyl and aralkyl groups and X⁻ represents an anion with a ketomethylene heterocyclic compound having the ketomethylene heterocyclic ring of said merocarbocyanine dyes and having a reactive arylaminomethylene group in the 5 position with respect to the member represented by Q in the general formula for said merocarbocyanine dye in an alkaline medium.

17. A process for preparing a dye having the general formula wherein R and R" represent members selected from the group consisting of alkyl and aralkyl groups, R' represents a member selected from the group consisting of hydrogen and a methyl group, L represents a methine group, n and m are positive integers from 1 to 2, X⁻ represents an anion and Z represents the non-metallic atoms necessary to complete a heterocyclic nucleus containing from 5 to 6 atoms in the heterocyclic ring, said nucleus being selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series, and a nucleus of the 3,3-dialkyl indolenine series comprising condensing a quaternary salt having the general formula

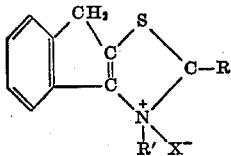

where R represents a member selected from the group consisting of hydrogen and a methyl group, R' represents a member selected from the group consisting of alkyl and aralkyl groups and X⁻ represents an anion with a heterocyclic ammonium quaternary salt having a reactive group selected from the group consisting of alkyl mercapto and aryl mercapto groups in a position selected from the group consisting of alpha and gamma positions with respect to the nitrogen atoms in said heterocyclic ring of said heterocyclic ammonium quaternary salt in the presence of an alkaline condensing agent.

18. A process for preparing a dye having the general formula

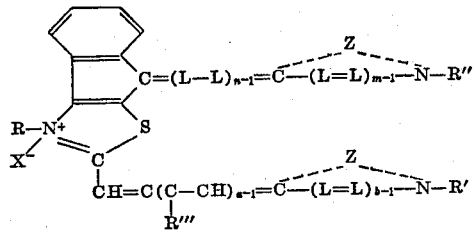

where R, R' and R" represent members selected from the group consisting of alkyl and aralkyl groups, R''' represents a member selected from the group consisting of hydrogen and an alkyl group, L represents a methine group, $b$, $m$ and $n$ represent members selected from the group of positive integers from one to two, $a$ represents a positive integer from one to three, X⁻ represents an anion and Z represents the non-metallic atoms necessary to complete a heterocyclic nucleus containing from 5 to 6 atoms in the heterocyclic ring, said heterocyclic nucleus being selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series and a nucleus of the 3,3-dialkyl indolenine series comprising condensing 2-methyl-(2,1d)indenothiazole ethiodide with a heterocyclic ammonium quaternary salt selected from the group consisting of 2-beta-acetanilidovinyl benzoxazole ethiodide, 2-beta-acetanilidovinyl thiozoline ethiodide, and 2-methyl mercaptobenzothiazole etho-p-toluene sulfonate in the presence of an alkaline condensing agent.

References Cited in the file of this patent

UNITED STATES PATENTS

| | | |
|---|---|---|
| 1,970,656 | Johnson | Aug. 21, 1934 |
| 2,066,966 | Dieterle | Jan. 5, 1937 |
| 2,071,899 | Piggott | Feb. 23, 1937 |
| 2,186,419 | Mathes | Jan. 9, 1940 |
| 2,336,463 | Brooker et al. | Dec. 14, 1943 |
| 2,338,782 | Riester | Jan. 11, 1944 |
| 2,455,420 | Kendall | Dec. 7, 1948 |
| 2,475,136 | Heimbach | July 5, 1949 |
| 2,496,899 | Thompson | Feb. 7, 1950 |
| 2,563,401 | Emerson et al. | Aug. 7, 1951 |
| 2,581,932 | Smith | Jan. 8, 1952 |

OTHER REFERENCES

Chemical Abstracts, 16, 3101. (Copy in S.L.) (Abstract of Brit. Med. Journal, 1922, I, 514–5.)

Chemical Abstracts, 19, 530. (Copy in S.L.) (Abstract of Proc. Roy. Soc., London, 96B 317–33, 1924.)

Clerc: "Photography Theory and Practice," 3rd ed., p. 151, Pitman Pub. Corp., N.Y., 1942. (Copy in Div. 60.)